July 31, 1928.
M. W. MOESTA
1,679,094
VEHICLE BODY CONSTRUCTION
Filed Nov. 23, 1925
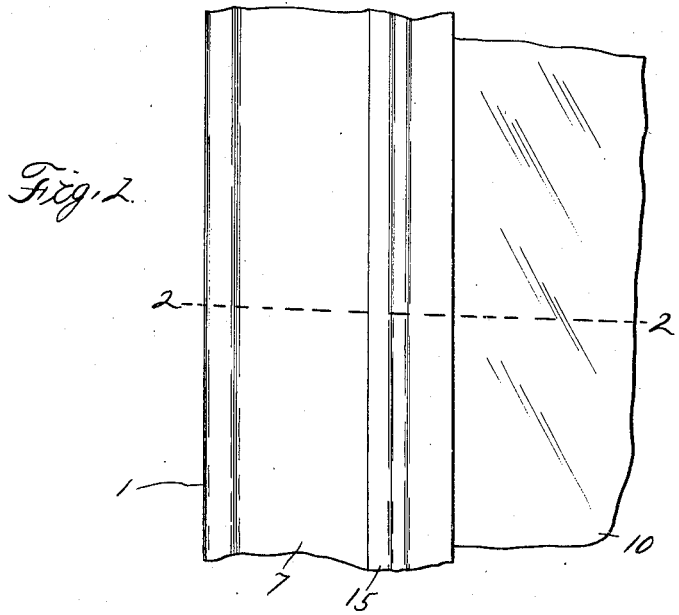
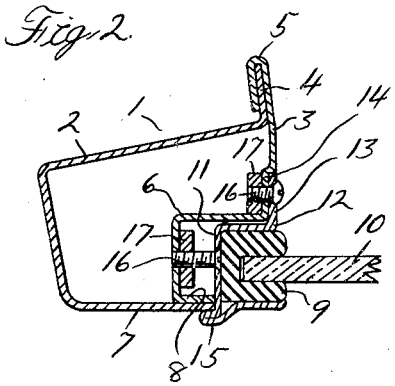
Inventor
Marvin W. Moesta
By
Whittemore Hulbert Whittemore
+Belknap
Attorneys Patented July 31, 1928.

1,679,094

UNITED STATES PATENT OFFICE.

MARVIN W. MOESTA, OF DETROIT, MICHIGAN, ASSIGNOR TO MURRAY BODY CORPORATION, OF DETROIT, MICHIGAN, A CORPORATION OF MICHIGAN.

VEHICLE-BODY CONSTRUCTION.

Application filed November 23, 1925. Serial No. 70,849.

This invention relates generally to windshield supports and consists of certain novel features of construction, combinations and arrangements of parts as will be more fully described and particularly pointed out in the appended claims.

In the accompanying drawing:

Figure 1 is a front elevation of an assembly embodying my invention.

Figure 2 is a sectional view taken on the line 2—2 of Figure 1.

Referring now to the drawing, the numeral 1 designates a metallic pillar, preferably of a vehicle body of the closed type, consisting of two sections 2 and 3 respectively. As shown, the section or body portion 2 of the pillar is preferably channel-shape in cross section and is provided at the inner rearward edge of the channel with a rearwardly extending flange 4 which constitutes an abutment for a swingingly mounted door (not shown) of the vehicle body. The section 3 preferably closes the channel of the section 2 and consists of a metal strip having a return-bent portion 5 embracing and welded to the flange 4 and having a channel-shape portion 6 welded to the rear wall 7 of the body portion 2 at the inner edge thereof. Thus, a tubular pillar is provided which is capable of taking up torsional strains and stresses to which the vehicle body may be subjected. Moreover, the arrangement is such that the section 3 may be easily and quickly assembled with the channel-shape body 2 of the pillar. This is especially true inasmuch as the channel-shape portion 6 is of sufficient width to permit suitable welding tools or fixtures to be applied within the channel to secure the flange 8 thereof to the rear wall 7 of the body portion 2.

In order that a sliding windshield may be assembled quickly with the pillar, the resilient channel runway 9 for the glass panel 10 is preferably fixed within the channel-shaped portion 11 of a finish strip 12 which in turn is preferably detachably secured to the tubular pillar. As shown, the lateral portion 13 of this finish strip seats within a suitable depression 14 in the pillar section 3, while the lateral return-bent flange 15 at the outer rear edge of the channel 11 preferably overlaps the rear wall 7 of the pillar and is of sufficient width to conceal the points where the channel 6 of the section 3 and the wall 7 of the body portion 2 are spot welded together. Hence, with this construction it is unnecessary to finish up the front wall 7 of the pillar in the usual way to conceal the spot welds and a considerable saving of time and labor is effected. Any suitable means such as the screws 16 may be used to secure the finish strip 12 to the pillar. As shown, these screws preferably pass through the base of the channel 11 and the lateral portion 13 and threadedly engage the section 3 and nuts 17 anchored thereon.

Thus, from the foregoing description, it will be apparent that the assembly of the windshield with the front body pillar is greatly simplified. Moreover this construction does not require the use of wooden filler strips and trimming material for holding the glass runways in position.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. In combination, a pillar having an outwardly opening, longitudinally extending channel-shaped portion with the base of the channel substantially parallel to the inner wall of the pillar, and a glass run holder upon the inner side of said pillar having a base substantially parallel to the base of said channel portion, and securing means for said holder including an element extending through said parallel bases.

2. In combination, a pillar, a glass run holder, and securing means for said holder carried by said pillar, one wall of said pillar having off-set portions disposed in substantially parallel planes, the innermost of said portions being within the pillar, the holder having a base substantially parallel to said innermost portion, and said securing means being adjustable transversely of said innermost portion of the base aforesaid of said holder.

3. In combination, a pillar having two walls, one of said walls having off-set portions disposed in substantially parallel planes, the innermost of said portions being within the pillar, a glass run holder having its base substantially parallel to and movable toward and away from said inner-most portion, said holder also having a lateral flange overlapping the outermost of said portions of said wall, and securing means for said holder adjustable through the flange just mentioned of said holder and the outermost portion aforesaid of said wall.

4. In combination, a pillar having two walls, one of said walls having off-set portions disposed in substantially parallel planes, the innermost of said portions being within the pillar and having a flange secured to the other of said walls, a glass run holder having its base substantially parallel to the innermost portion aforesaid and having a lateral flange overlapping the last mentioned wall, and securing means for said holder adjustable transversely of the base of said holder and the innermost portion aforesaid of said first mentioned wall.

5. In combination, a tubular pillar having two of its walls disposed at substantially right angles to each other, one of said walls having a portion off-set inwardly and extending at substantially right angles to the other of the walls aforesaid, said off-set portion being substantially L-shape in cross section and co-operating with the other of said walls to form an outwardly opening channel, a glass run holder having its base substantially parallel to the base of the outwardly opening channel, and securing means for said holder adjustable transversely of the base of the holder and the off-set portion aforesaid.

6. In combination, a pillar having two walls, one of said walls having a portion off-set inwardly and disposed upon the inner side of the other of said walls and secured thereto, said off-set portion co-operating with the other of said walls to form an outwardly opening channel, a glass run holder having its base extending longitudinally of the outwardly opening channel and having lateral flanges overlapping the edges of the outwardly opening channel and portions of the two walls aforesaid, and securing means for said holder carried by one of said walls of the off-set portion aforesaid.

In testimony whereof I affix my signature.

MARVIN W. MOESTA.